(12) United States Patent
Weckerling et al.

(10) Patent No.: US 6,709,338 B2
(45) Date of Patent: Mar. 23, 2004

(54) CONSTANT VELOCITY FIXED BALL JOINT AS A COUNTER TRACK JOINT

(75) Inventors: Thomas Weckerling, Lohmar (DE); Stephan Maucher, Siegburg (DE); Peter Harz, Hennef (DE); Wolfgang Hildebrandt, Siegburg (DE)

(73) Assignee: GKN Automotive GmbH (DE)

( * ) Notice: Subject to any disclaimer, the term of this patent is extended or adjusted under 35 U.S.C. 154(b) by 62 days.

(21) Appl. No.: 10/020,070

(22) Filed: Nov. 30, 2001

(65) Prior Publication Data

US 2002/0094230 A1 Jul. 18, 2002

(30) Foreign Application Priority Data

Dec. 4, 2000 (DE) .......................................... 100 60 117

(51) Int. Cl.[7] ............................................... F16D 3/224
(52) U.S. Cl. ........................................ 464/145; 464/906
(58) Field of Search ................................. 464/145, 906; F16D 3/224

(56) References Cited

U.S. PATENT DOCUMENTS

| | | | | |
|---|---|---|---|---|
| 1,916,442 A | * | 7/1933 | Rzeppa | 464/145 |
| 2,875,600 A | * | 3/1959 | Miller, Jr. | 464/906 X |
| 4,950,206 A | * | 8/1990 | Jacob | 464/145 X |
| 5,067,929 A | * | 11/1991 | Krude | 464/145 |
| 5,288,273 A | * | 2/1994 | Krude | 464/145 |
| 5,616,081 A | * | 4/1997 | Krude et al. | 464/145 |
| 6,261,184 B1 | * | 7/2001 | Jacob et al. | 464/145 X |

* cited by examiner

*Primary Examiner*—Greg Binda

(57) ABSTRACT

A constant velocity fixed ball joint in the form of a counter track joint, having an outer joint part with outer tracks, an inner joint part with inner tracks, torque transmitting balls received in pairs of tracks formed of outer tracks and inner tracks, and a ball cage with cage windows in which the balls are held in a common plane and guided on to the angle-bisecting plane when the joint is articulated. First outer tracks, together with first inner tracks, form first pairs of tracks whose control angles open in a first axial direction. Second outer tracks, together with second inner tracks, form second pairs of tracks whose control angles open in a second axial direction, with the control angles being defined as angles between the tangents at the ball contact points in the tracks when the joint is in the aligned condition. The outer joint part forms a first stop-and-guiding face for a spherical outer face of the ball cage. A securing element at the outer joint part forms a second stop-and-guiding face for the spherical outer face of the ball cage. The inner face of the outer joint is undercut-free if viewed in the second axial direction.

8 Claims, 8 Drawing Sheets

CONSTANT VELOCITY FIXED BALL JOINT AS A COUNTER TRACK JOINT

TECHNICAL FIELD

The present invention relates to constant velocity joints and more particularly, concerns constant velocity joint of the counter track type.

BACKGROUND OF THE INVENTION

Constant velocity fixed ball joints in the form of a counter track joint, having an outer joint part with outer tracks, an inner joint part with inner tracks, torque transmitting balls which are received in pairs of tracks consisting of outer tracks and inner tracks, and a ball cage with cage windows in which the balls are held in a common plane and are guided on to the angle-bisecting plane when the joint is articulated are such joints, wherein first outer tracks, together with first inner tracks, form first pairs of tracks whose control angles open in a first axial direction $R_1$, and second outer tracks, together with second inner tracks, form second pairs of tracks whose control angles open in a second axial direction $R_2$. The control angles are defined as angles between the tangents at the ball contact points in the tracks when the joint is in the aligned condition. The control angles are formed by an axial offset of the centers of curvature of the outer tracks and of the inner tracks in the respective component relative to a central joint plane defined by the centers of the balls when the joint is in the aligned condition.

With constant velocity fixed ball joints of this type, provision is generally made for the outer face of the cage and/or the inner face of the cage to be approximately spherical in shape for the purpose of being supported relative to the outer joint part and/or the inner joint part. When assembling such joints, use is made of the known over-articulating method when mounting the balls, i.e. first the outer joint part, the ball cage and the inner joint part are inserted into one another without the balls, whereupon excessively large articulation angles which cannot be achieved under operational conditions are set between the outer joint part and the inner joint part. The balls are then inserted into the cage windows from the outside in different articulation positions.

It would therefore be desirable to provide an improved joint of the foregoing type which permits a simplified method of manufacture and/or assembly.

SUMMARY OF THE INVENTION

A constant velocity fixed ball joint having improved assembly is provided. In the constant velocity fixed ball joint disclosed, the outer joint part forms a first stop-and-guiding face for a spherical outer face of the ball cage, and the first stop-and-guiding face is undercut-free if viewed in a first axial direction. A securing element at the outer joint part forms a second stop-and-guiding face for a spherical outer face of the ball cage or of the inner joint part. The inner face of the outer joint part is undercut-free if viewed in a second axial direction. The inner joint part can be introduced coaxially into the ball cage in the second axial direction. In particular, the inner face of the ball cage is also undercut-free if viewed in the second axial direction. The above-mentioned characteristics allow the joint to be assembled entirely axially, i.e. the outer joint part, the ball cage with the inserted balls and the inner joint part can be inserted into one another in coaxial positions. The outer joint part, the ball cage and the inner joint part are stacked one behind the other in a starting position. First the balls, with their centers, are passed through the aperture plane of the outer joint part and, only thereafter, by moving on the joint inner part, the balls enter the outer tracks in the outer joint part and the inner tracks in the inner joint part. After the ball cage has stopped against the stop-and-guiding face in the outer joint part, the joint is secured by a securing element attached to the outer joint part. To the extent that reference is made to the joint aperture of the outer joint part, in the assembly operation of a joint with a separately produced base or, in the case of disc joints, this can refer to the aperture pointing towards the joint base or attachment flange; and the securing element to be bolted on, can be the joint base itself or an annular or cover element inserted between the outer joint part and the joint base.

When applying the above-mentioned assembly method, it is possible, in one embodiment of the invention, for the inner joint part to be produced so as to be integral with a joint journal or with a shaft shank.

According to another embodiment, the ball cage, on its inside, forms a third stop-and-guiding face for a spherical outer face of the inner joint part. However, such a contact between the inner joint part and the ball cage is not absolutely essential. Axial fixing of the inner joint part relative to the ball cage can also be effected in both axial directions indirectly via ball tracks, balls and cage windows.

As already mentioned in connection with the possible assembly, the securing element can be an annular additional element attached to the joint aperture of the outer joint part or individual wedge elements attached to, or formed on to, the joint aperture of the outer joint part, with the second axial direction pointing from the joint aperture to the joint center. Alternatively, the securing element can be the joint base produced separately from the outer joint part or a ring- or cover-shaped additional element inserted between the outer joint part and the joint base, with the second axial direction pointing from the joint base to the joint center.

Special advantages of the inventive joint are provided in that, as a result of its undercut-free inner contour, the cage can be produced advantageously from a production-technical point of view, by non-cutting forming by a punch. Also, the guiding faces for the outer joint part for the ball cage are undercut-free, which, at least as far as the cage faces are concerned, makes it possible for these to be produced in a simplified way by forming same in a non-chip producing way. Simplifications are also achieved as regards the production of the outer joint part by producing an undercut-free inner face which can also be produced advantageously by a non-chip producing forming operation, using an undivided tool. If, in accordance with another embodiment, at least part of the pairs of tracks is undercut-free, it is advantageous to position the respective undercut-free tracks in the outer joint part in the same direction as the undercut-free stop-and-guiding face for the ball cage. As a result, a substantial part of the inner surface of the outer joint part can be formed by a one-piece inner punch.

Other advantages of the invention will become apparent upon reading the following detailed description and appended claims, and upon reference to the accompanying drawings.

BRIEF DESCRIPTION OF THE DRAWINGS

For a more complete understanding of this invention, reference should now be made to the embodiments illustrated in greater detail in the accompanying drawings and described below by way of examples of the invention.

In the drawings.

DETAILED DESCRIPTION OF THE INVENTION

Figure 1A:
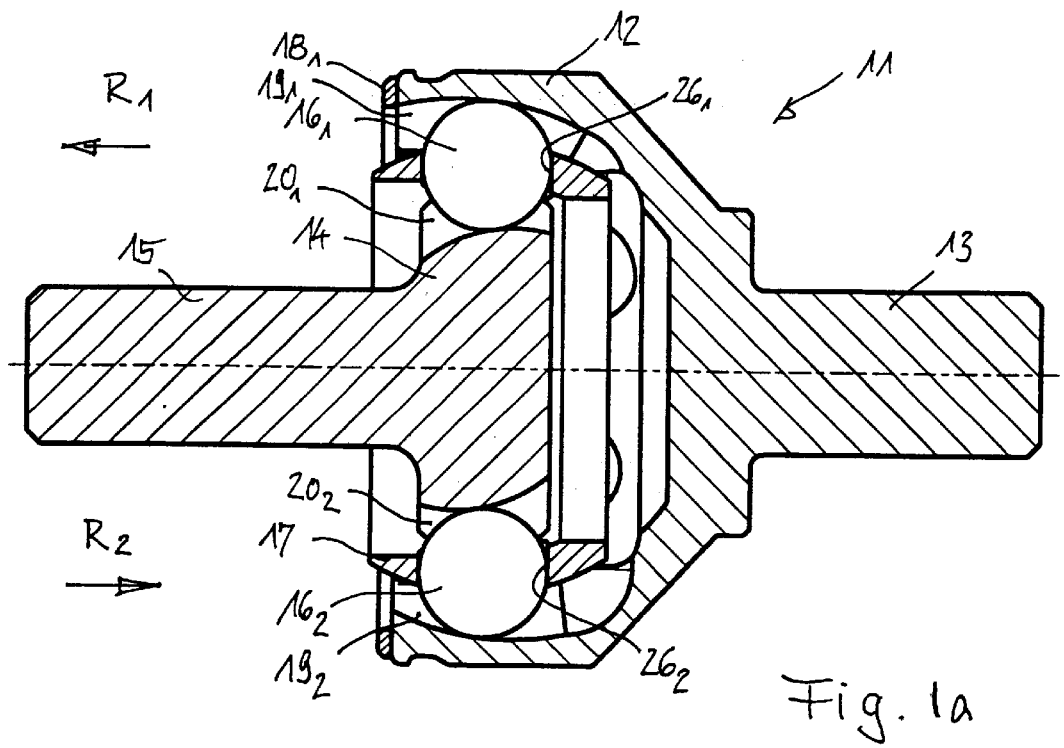
FIG. 1 shows an inventive fixed counter track joint with a one-piece outer joint part in a first embodiment: (a) in a longitudinal section through a ball track plane; (b) in a longitudinal section through a plane between ball tracks.

In the description that follows, the two Figures of each embodiment will be described jointly. Thus, to the extent the same parts are shown in the various views, they are given the same reference numerals. Below, the different sections and illustrations of the individual Figures will be described jointly.

Initially, FIGS. 1 and 2 will be described jointly because the joints illustrated therein are based substantially on the same principle. The differences will be described later.

Figure 1B:
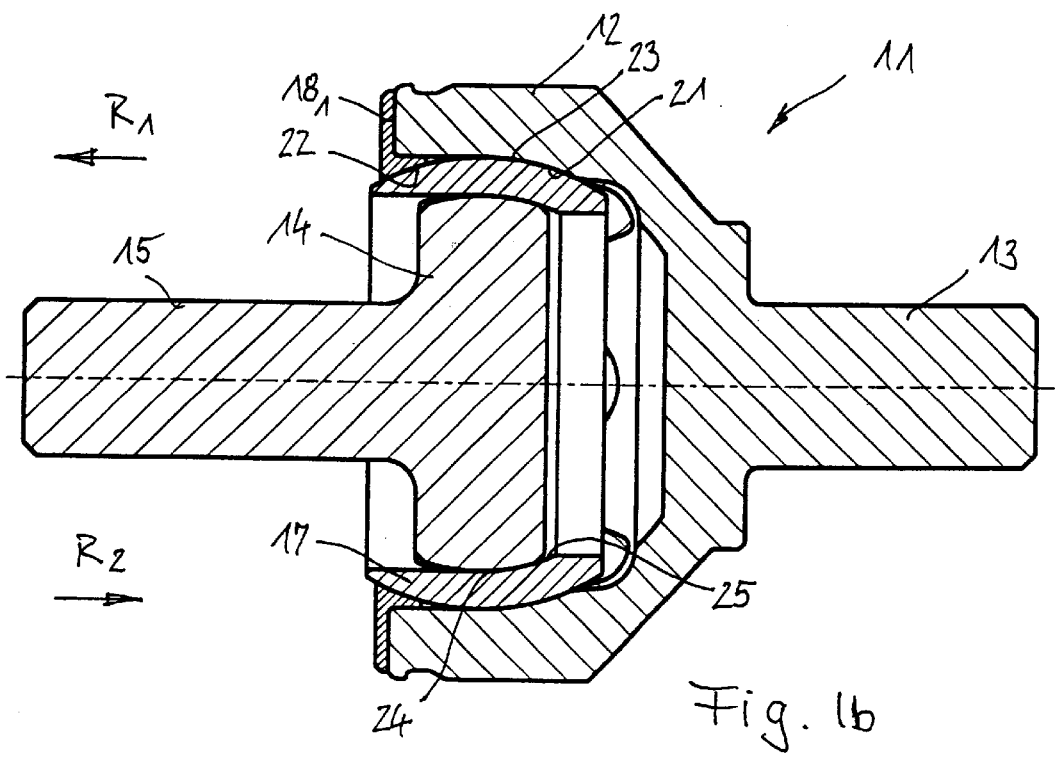
Figure 2A:
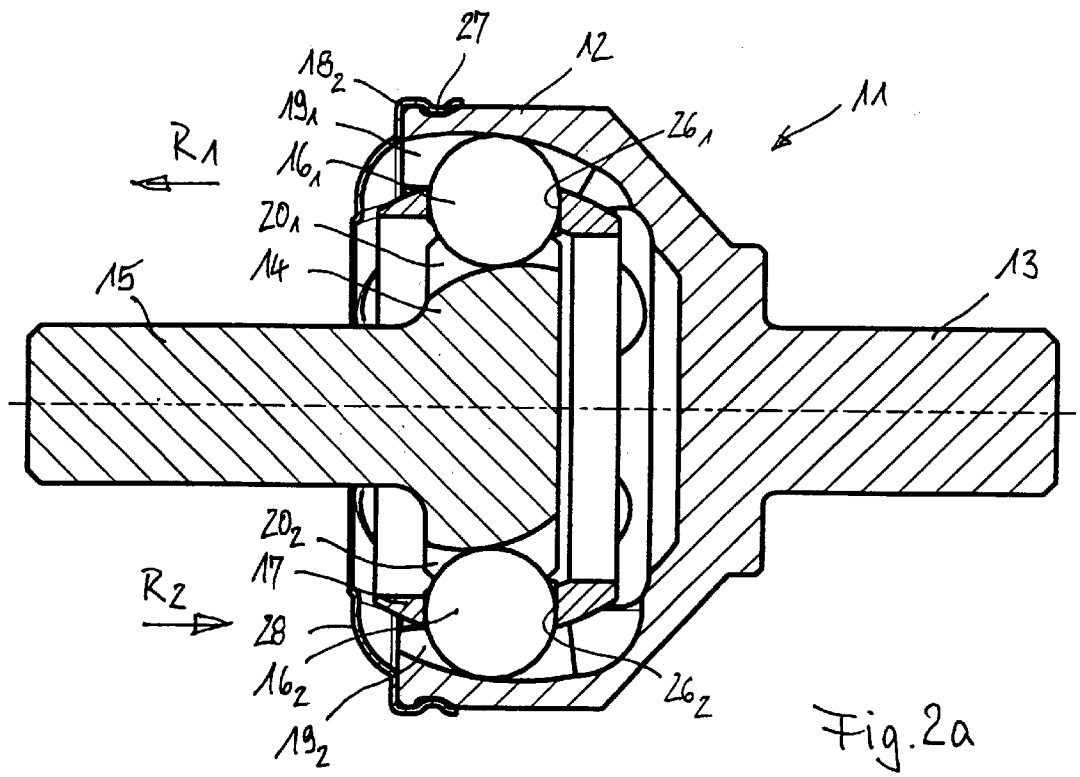
FIG. 2 shows an inventive fixed counter track joint with a one-piece outer joint part in a second embodiment: (a) in a longitudinal section through a ball track plane; (b) in a longitudinal section through a plane between ball tracks.
Figure 2B:
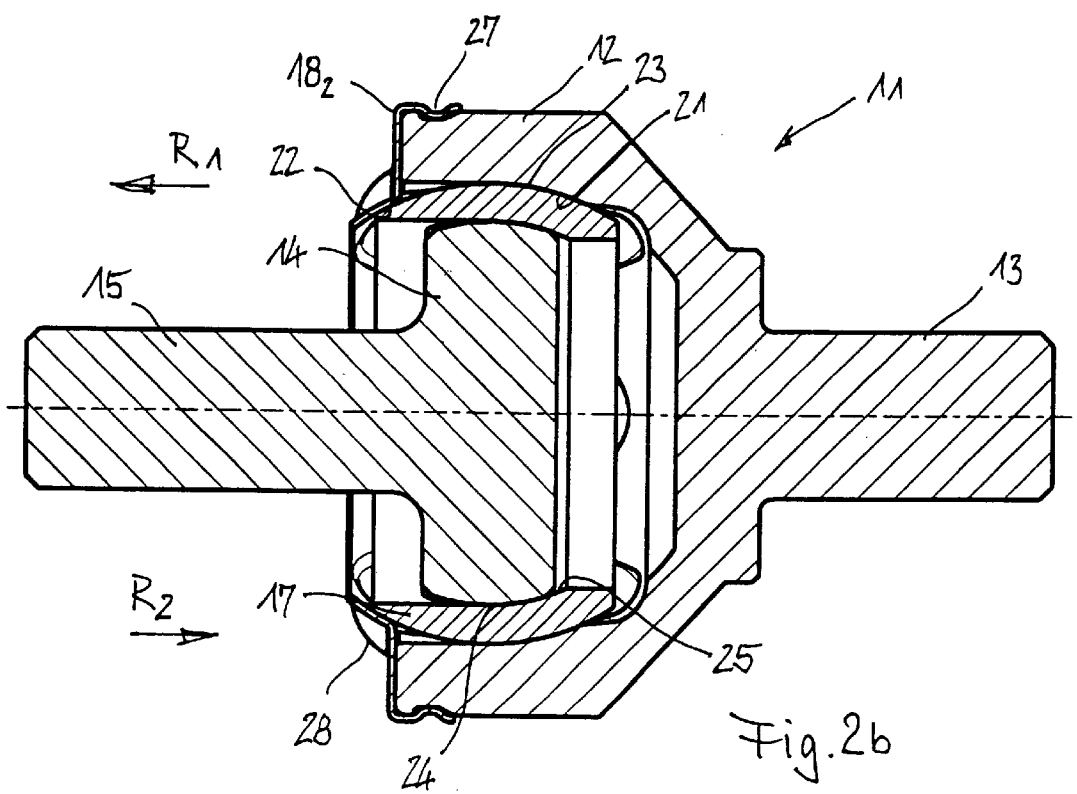

FIGS. 1 and 2 each show an embodiment of fixed counter track joint according to the present invention. Each counter track joint 11 includes an outer joint part 12 with formed-on journals 13, an inner joint part 14 with formed-on journals 15, balls $16_1$, $16_2$, a ball cage 17 and a securing element 18. The joint is provided in the form of a counter track joint. Thus, first outer ball tracks $19_1$ are provided in the outer joint part 12 and first inner ball tracks $20_1$ are provided in the inner joint part 14 and hold first balls $16_1$. The first tracks 19, 20 are designed axially oppositely relative to second outer ball tracks $19_2$ in the outer joint part 12 and relative to second inner ball tracks $20_2$ provided in the inner joint part 14 and holding first second balls $16_2$. The first track pairs $19_1$, $20_1$ have control angles which open in the first direction $R_1$ and the second track pairs $19_2$, $20_2$ have control angles which open in the second direction $R_2$. The tracks are provided in the form of Rzeppa tracks, i.e. their track center lines (not shown), like the illustrated track base lines, extend in circular arches whose centers are axially offset from one another with reference to the associated tracks $19_1$, $20_1$ and $19_2$, $20_2$ respectively. The counter track formation is achieved in that the centers of curvature of the outer tracks $19_1$, $19_2$ in the outer joint part are circumferentially alternately offset in apposite axial directions relative to the central joint plane and, equally, the centers of curvature of the inner ball tracks $20_1$, $20_2$ are circumferentially alternately offset in opposite axial directions relative to the central joint plane. The outer joint part 12 forms a first stop-and-guiding face 21 for the spherical outer face 23 of the ball cage 17. If viewed in the second direction $R_2$, the inner first stop-and-guiding face 21 for the cage 17 is undercut-free and in consequence, permits the cage 17 to be introduced coaxially into the outer joint part 12. The cage 17 is secured against being dismantled, by a second stop-and-guiding face 22 in the subsequently inserted securing element 18. The second guiding face 22 includes individual circumferential portions between which there are provided recesses for the ball tracks 19. By means of its spherical outer face 23, the ball cage is guided between the guiding faces 21, 22. By means of its spherical outer face 24, the inner joint part 14 is supported on an inner third stop-and-guiding face 25 of the ball cage, which face 25, in the second direction $R_2$, is also undercut-free, so that the inner joint part 14 can be introduced into the ball cage 17 in a coaxial position. The inner joint part is protected from being dismantled by the balls 16 held in the cage windows 26 of the ball cage 17. Advantageously, the axial assembly of the outer joint part, ball cage and inner joint part can be effected with the balls being in the inserted position in the cage windows, so that over-articulating during assembly is not necessary.

Whereas in FIG. 1, the securing element $18_1$ is provided in the form of a disc member provided with attached wedges and connected to the end face of the outer joint part 12, the securing element $18_2$ shown in FIG. 2 is provided in the form of an annular cap member which includes formations 28 to allow the entry of the balls and which is secured in a groove 27 at the circumference of the outer joint part. Apart from these slight deviations, FIGS. 1 and 2 are otherwise the same.

FIGS. 3 to 6 will initially be described jointly below because the joints shown therein are substantially based on the same principle. The differences will be described later.

FIGS. 3 to 6 show embodiments of a constant velocity fixed joint according to the present invention. The joint 41 includes an outer joint part 42 with an attached base 48, an inner joint part 44 with formed-on journal 45, balls $46_1$, $46_2$ and a ball cage 47. The directions $R_1$, $R_2$ which relate to the freedom from undercuts and assembly purposes have been exchanged as compared to the previous embodiment. Thus, the first axial direction $R_1$ points from the central joint plane to the joint base 48, and the second axial direction $R_2$ points from the joint base 48 to the central joint plane. In the present case, the base 48 forms the securing element.

The joint is provided in the form of a counter track joint. Thus, first outer ball tracks $49_1$ in the outer joint part 42 and first inner ball tracks $50_1$ in the inner joint part 44, with the ball tracks holding the balls $46_1$, are designed axially oppositely relative to second outer ball tracks $49_2$ in the outer joint part 42 and second inner ball tracks $50_2$ in the inner joint part 44, which hold the second balls $46_2$. The tracks are Rzeppa tracks, i.e. the track center lines (not shown), like the illustrated track base lines, extend in circular arches, whose centers are axially offset from one another with reference to the associated tracks $49_1$, $50_1$ and $49_2$, $50_2$, respectively. The counter track formation is achieved in that the centers of curvature of the outer tracks $49_1$, $49_2$ in the outer joint part are circumferentially alternately offset in opposite axial direction relative to the central joint plane and, equally, the centers of curvature of the inner ball tracks $50_1$, $50_2$ in the inner joint part are circumferentially alternately offset in opposite axial directions relative to the central joint plane. The outer joint part 42 includes a first stop-and-guiding face 51 for a spherical outer face 53 of the cage 47. If viewed in the second direction $R_2$, the inner first stop-and-guiding face 51 is undercut-free and in consequence, permits the cage 47 to be introduced coaxially into the outer joint part 42. The cage 47 is secured against being dismantled, by a second cage guiding face 52 in the subsequently attached base 48. By way of its spherical outer face 53, the ball cage is guided between the first and second stop-and-guiding faces 51, 52. By way of its spherical outer face 54, the inner joint part 44 is supported on an inner third stop-and-guiding face 55 of the ball cage, which face 55, in the second direction $R_2$, is also undercut-free, so that the inner joint part 44 can be introduced into the ball cage 47 in a coaxial position. The inner joint part is protected from being dismantled, by the balls 46 held in the cage windows 56 of the ball cage 47. Advantageously, the axial assembly of the outer joint part, ball cage and inner joint part can be effected with the balls being in the inserted position in the cage windows, so that over-articulating during assembly is not necessary.

Figure 3A:
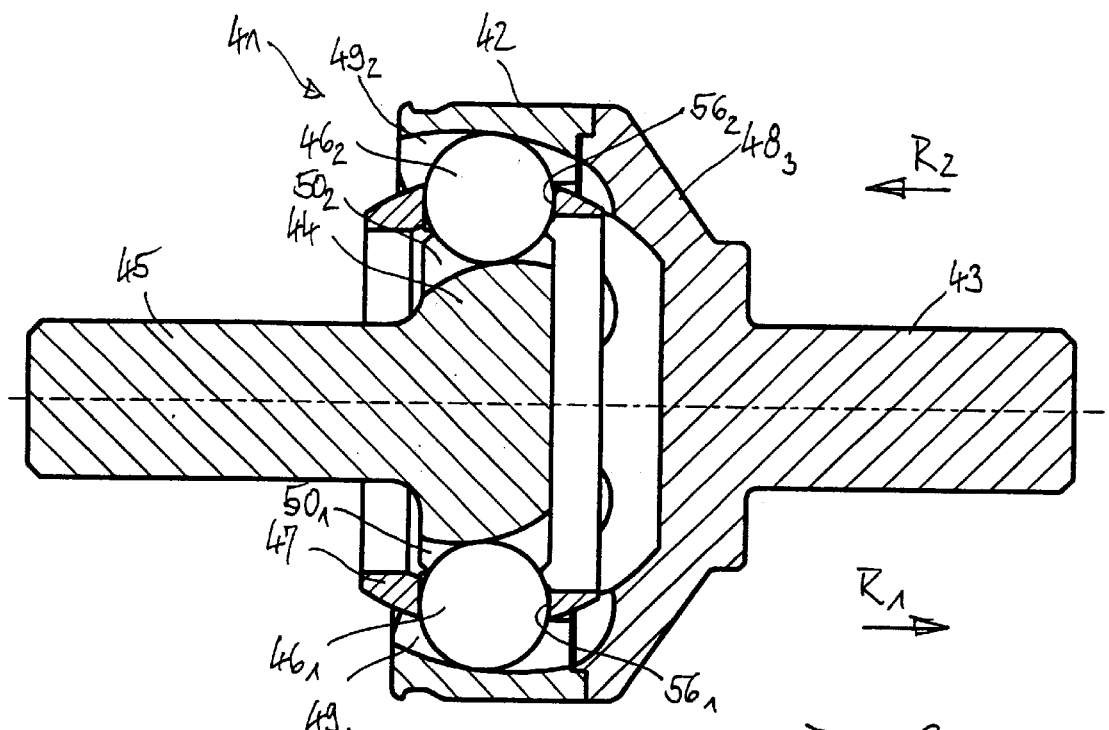
FIG. 3 shows an inventive fixed counter track joint with a welded-on joint base: (a) in a longitudinal section through a ball track plane; (b) in a longitudinal section through a plane between ball tracks.
Figure 3B:
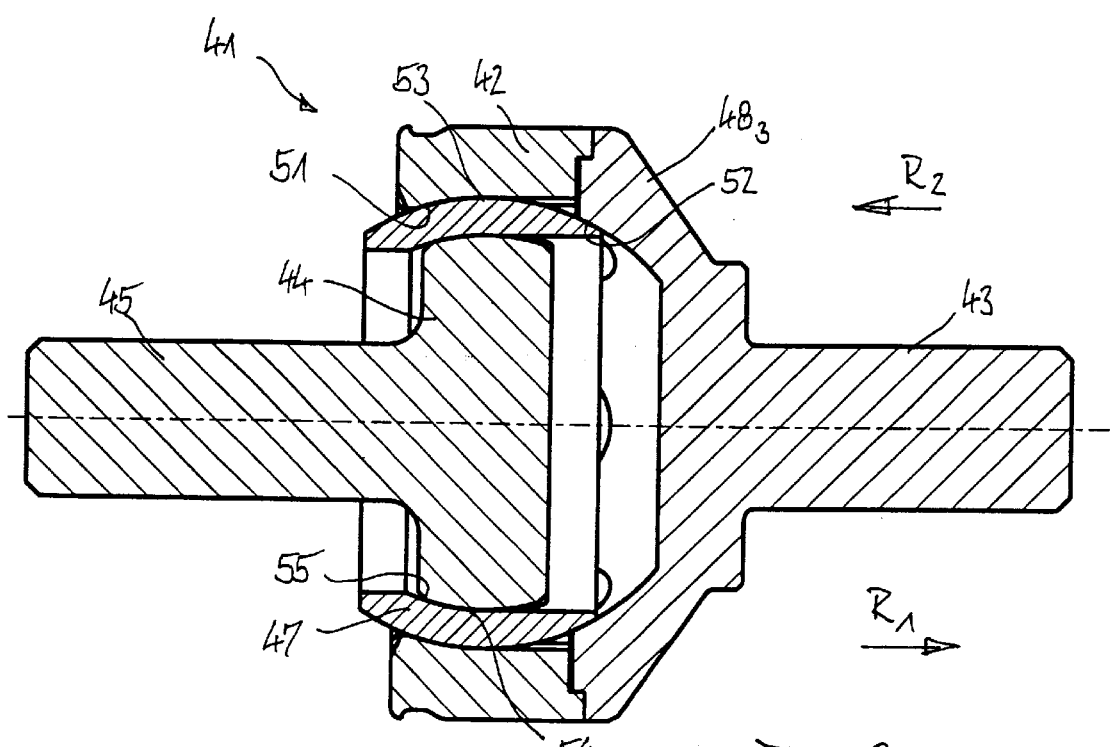
Figure 4A:
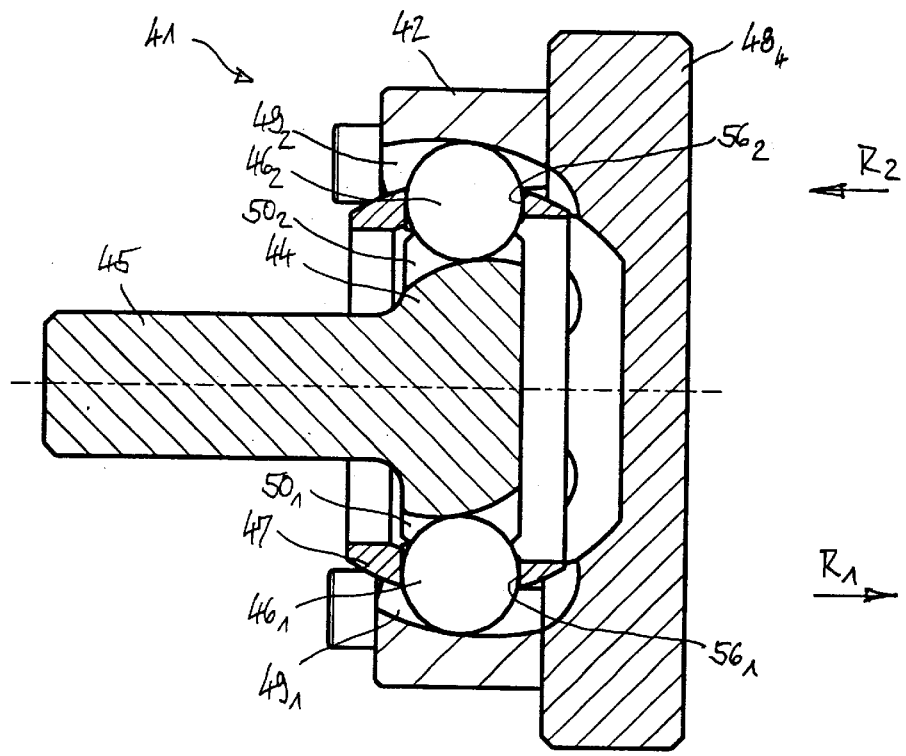
FIG. 4 shows an inventive fixed counter track joint with a bolted-on joint base in a first embodiment: (a) in a longitudinal section through a ball track plane; (b) in a longitudinal section through a plane between ball tracks.
Figure 4B:
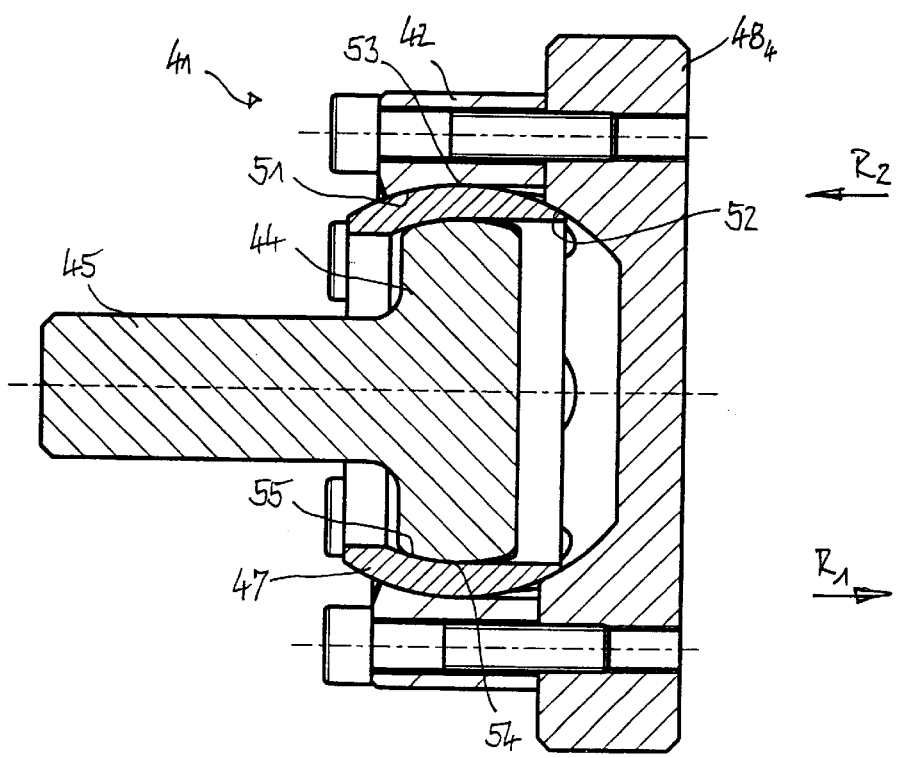
Figure 5A:
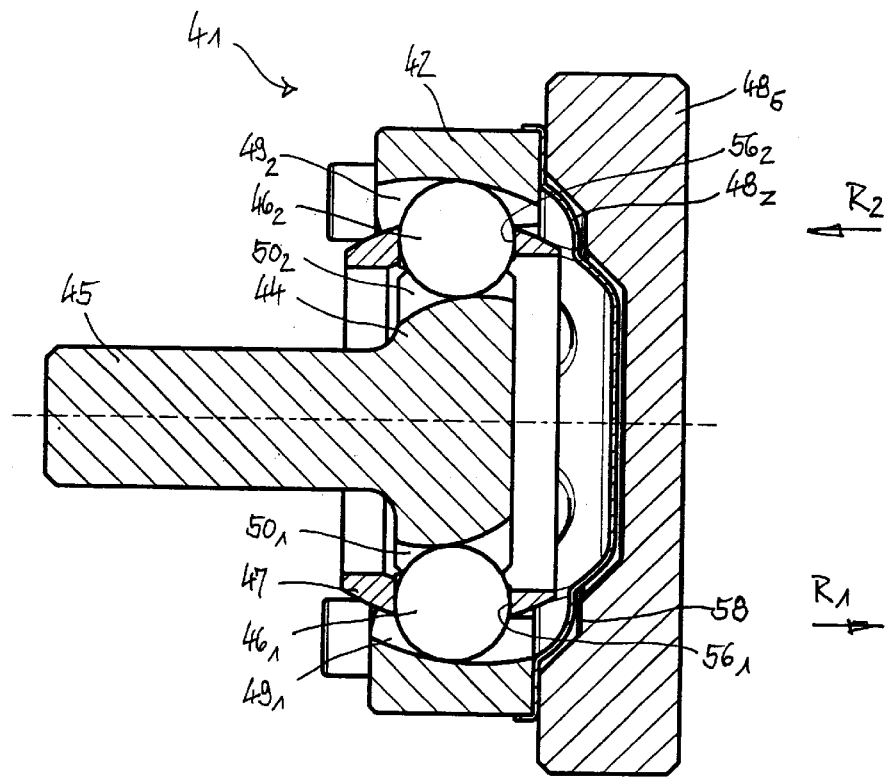
FIG. 5 shows an inventive fixed counter track joint in another embodiment with a bolted-on joint base: (a) in a longitudinal section through a ball track plane; (b) in a longitudinal section through a plane between ball tracks.
Figure 5B:
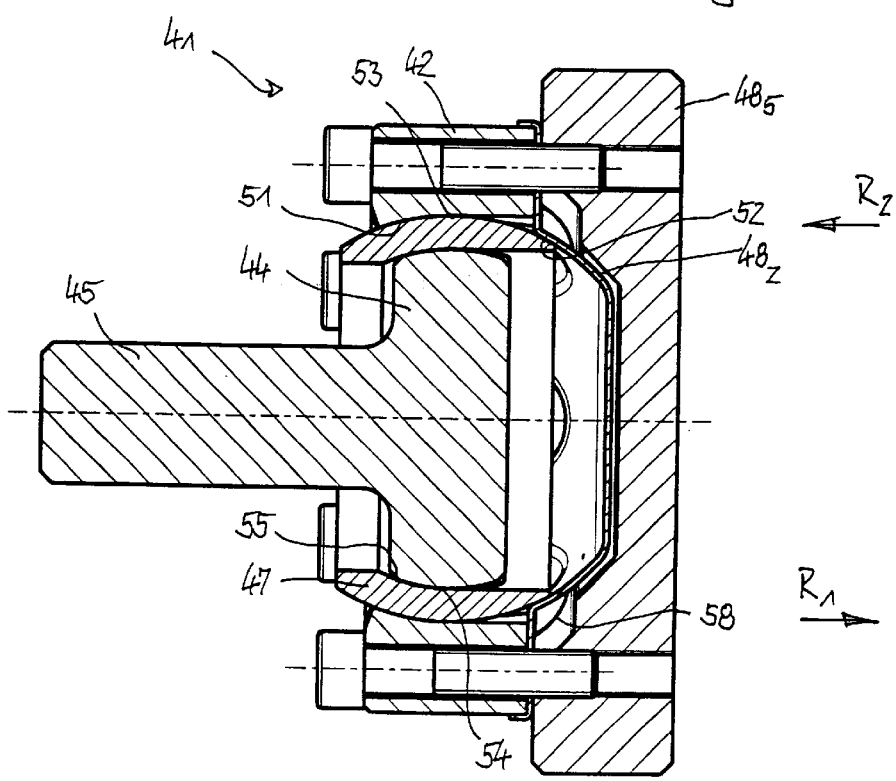
Figure 6A:
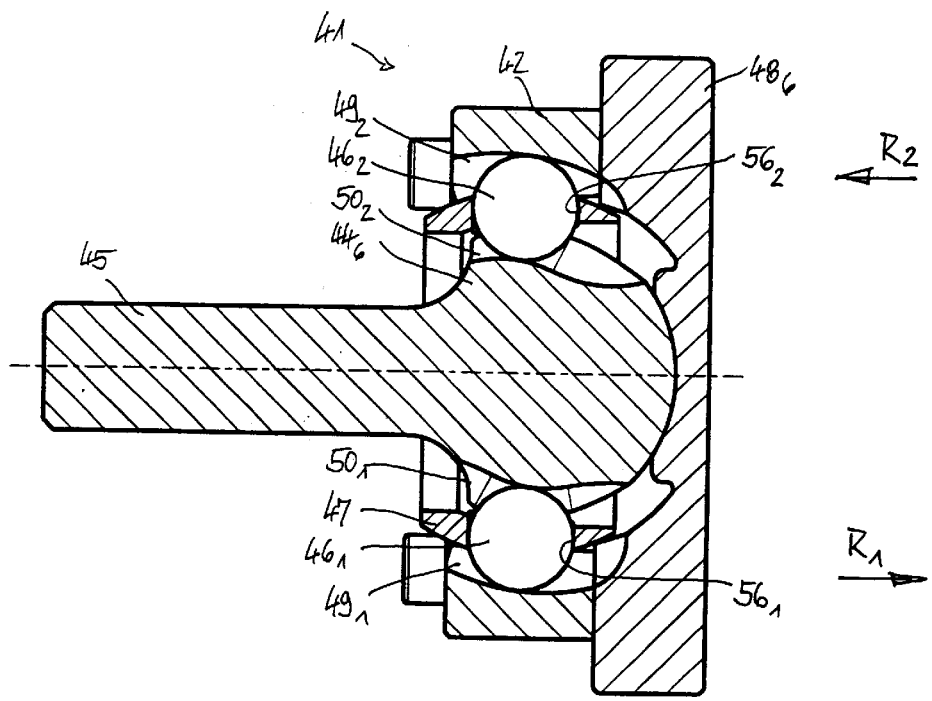
FIG. 6 shows an inventive fixed counter track joint in a further embodiment with a bolted-on joint base: (a) in a longitudinal section through a ball track plane; (b) in a longitudinal section through a plane between ball tracks.
Figure 6B:
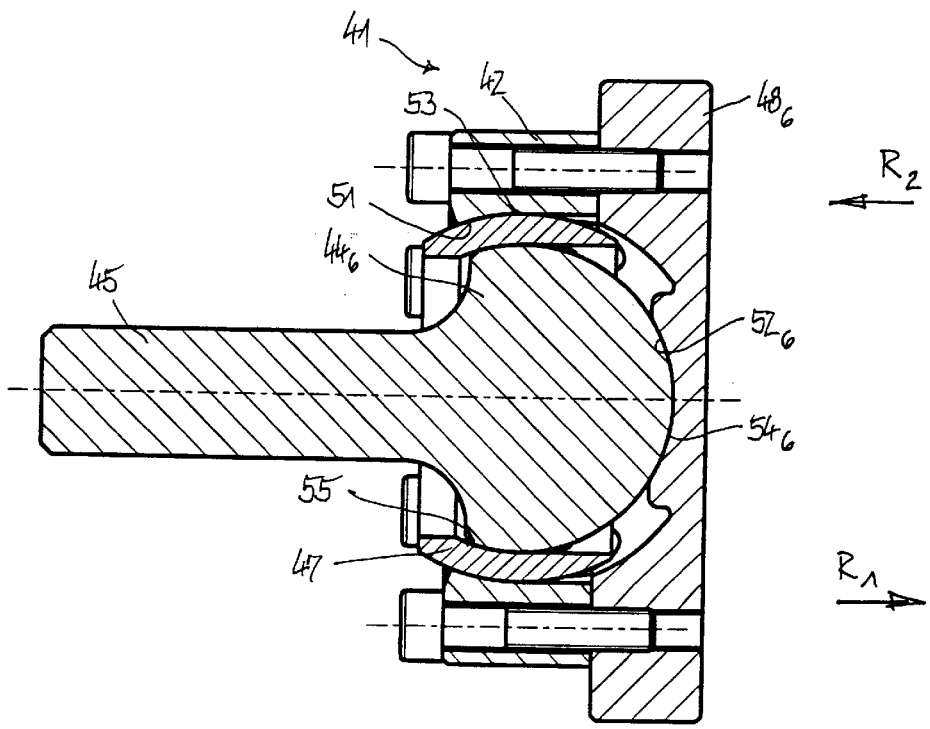

Whereas in FIG. 3, the base $48_3$ with the adjoining journal 43 is welded on, the base $48_4$, $48_5$, $48_6$ in FIGS. 4 to 6 is provided in the form of a flange which is bolted on. In FIG. 5, an additional element $48_z$ is inserted between the outer joint part 42 and the base $48_5$, which additional element includes formations 58 to allow the balls to enter. In FIGS. 3 to 5, the second stop-and-guiding face 52 has an annular face which is provided with recesses for the ball tracks 49, whereas the guiding face 52 in FIG. 6 is cup-shaped, with the inner joint part $44_6$ being directly supported thereon by way of the spherical outer face $54_6$. With the exception of the above deviations, FIGS. 3 to 6 are identical.

Figure 7A:
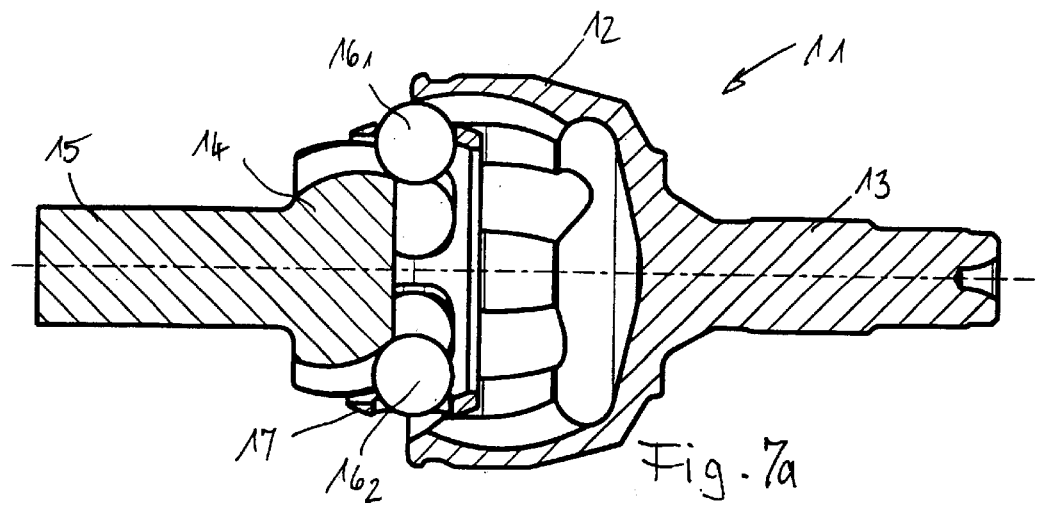
FIG. 7 shows an inventive joint similar to those joints shown in FIGS. 1 and 2, in sections through a ball track plane in three assembly positions.
Figure 7B:
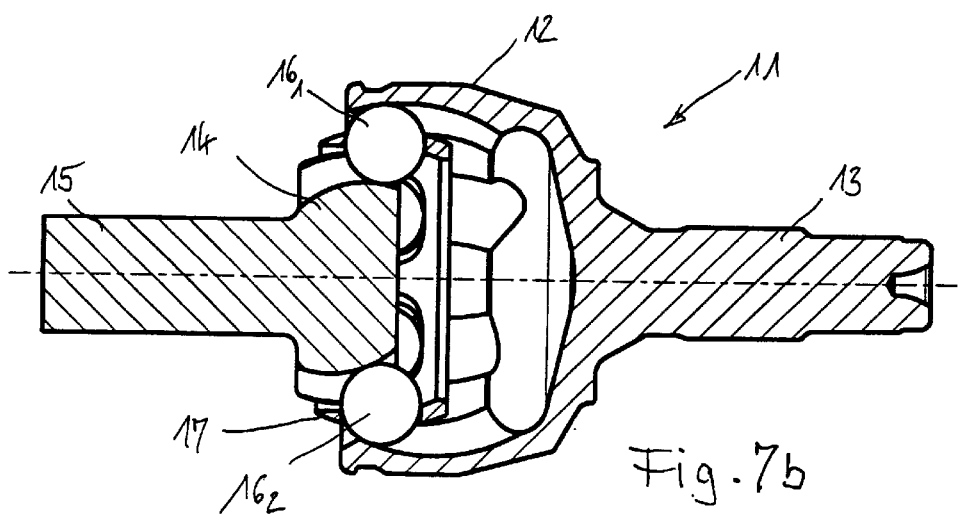
Figure 7C:
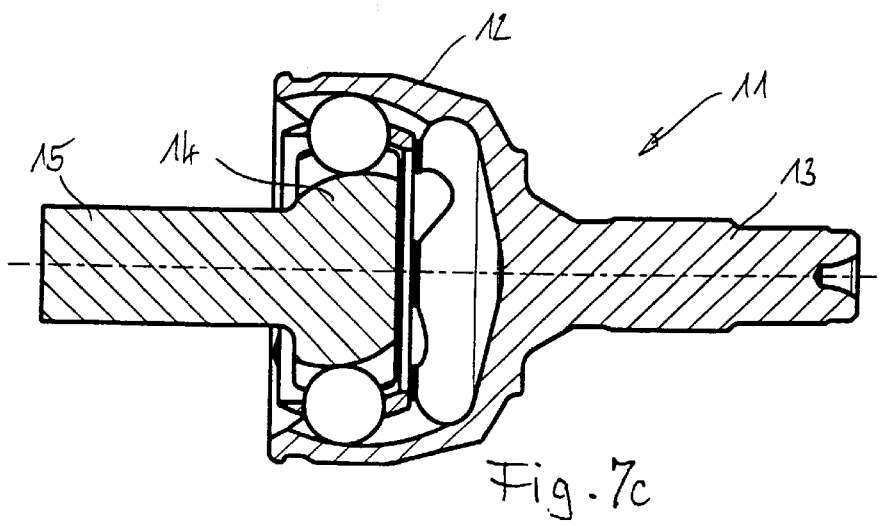
Figure 8A:
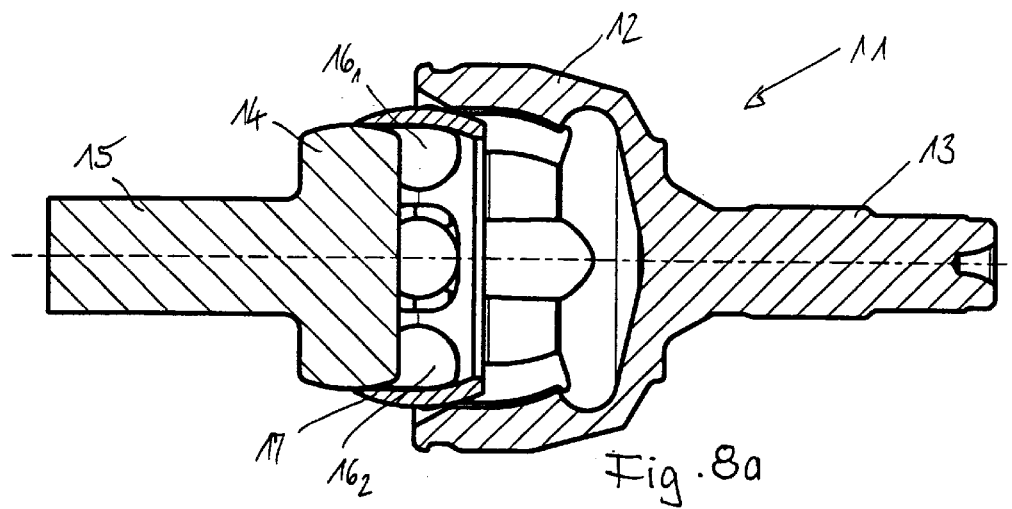
FIG. 8 shows the joint according to FIG. 7 in a section through a plane between ball tracks in three assembly positions.
Figure 8B:
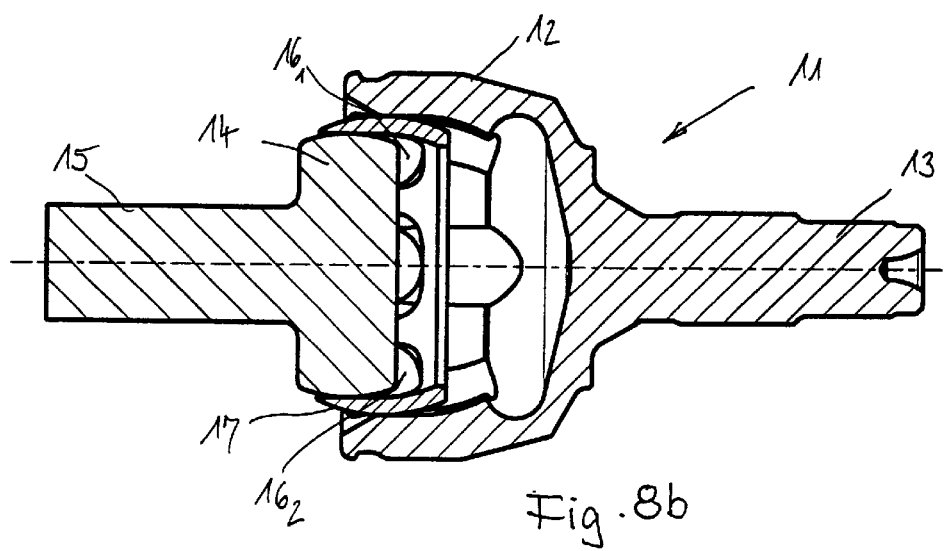
Figure 8C:
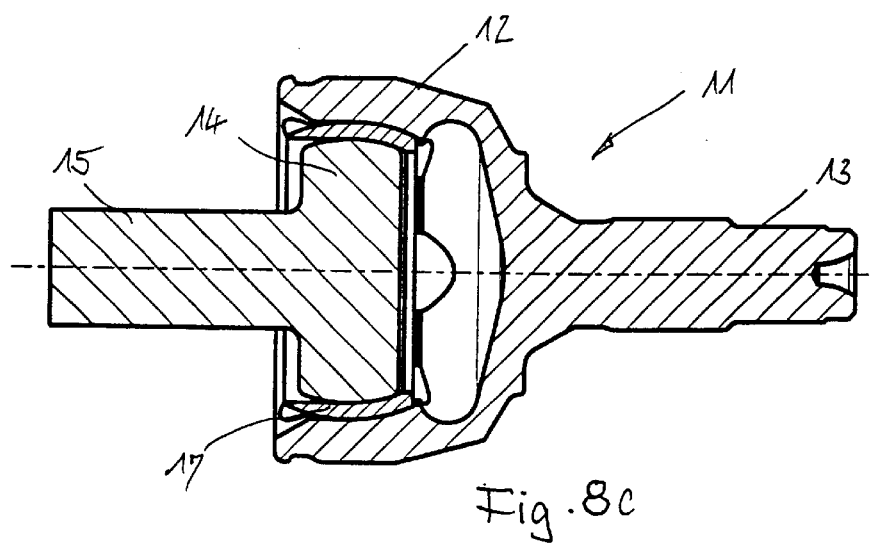

FIGS. 7 and 8 will now be described jointly, with, one after the other, FIGS. 7a and 8a, 7b and 8b and 7c and 8c being explained jointly, since they merely show different sections in identical situations. In the first position (a), the outer joint part 12, the inner joint part 14 and the ball cage 17 with the inserted balls 16 are shown in coaxial positions relative to one another, and they are axially stacked in such a way that the balls 16 are positioned in the aperture plane of the outer joint part. The ball cage 17, by way of its greatest outer diameter, passes through the aperture plane of the outer joint part 12, in which the undercut-free stop face 21 has its greatest, substantially identically sized diameter. The balls 16 have already entered the ball tracks 19 in the outer joint part 12, whereas they have only slightly entered the ball tracks 20 in the inner joint part 14. As, in this position, the balls 16 are positioned on the smallest pitch circle during the assembly operation, they cannot enter the ball tracks 20 in the inner joint part 14 any further.

In the second position illustrated (b), the ball cage 17 whose axial movement is completely unobstructed due to the stop face 21 being undercut-free has been axially inserted further, and the balls 16 have been able to move in the ball tracks 19 of the outer joint part 12 on to a greater pitch circle. As a result, the balls 16 are now able to enter the ball tracks 20 of the inner joint part 14 beyond their centers, with the inner joint part 14 being coaxially pushed on further.

In the third position illustrated (c), the ball cage 17, by way of its spherical outer face 23, has reached the stop and guiding face 21 in the outer joint part 12. The cage windows 26 thus form an axial stop for the balls $16_2$ which, due to the inner joint part 14 having moved on, are subjected to an axial force acting towards the right, by the ball tracks $19_2$, $20_2$. The spherical outer face 23 of the inner joint part 14 can, but does not have to, come to rest against the spherical inner face 24 of the ball cage.

From the foregoing it can be seen that there has been brought to the art a new and improved constant velocity joint having assembly advantages. While the invention has been described in connection with one or more embodiments, it should be understood that the invention is not limited to those embodiments. Thus, the invention covers all alternatives, modifications, and equivalents as may be included in the spirit and scope of the appended claims.

What is claimed is:

1. A constant velocity fixed ball joint in the form of a counter track joint, comprising:

an outer joint part with outer tracks;

an inner joint part with inner tracks;

torque transmitting balls which are received in pairs of tracks comprising said outer tracks and inner tracks;

a ball cage with cage windows in which the balls are held in a common plane and are guided on to an angle-bisecting plane when the joint is articulated, the outer joint part forming a first stop-and-guiding face for a spherical outer face of the ball cage; and, a securing element at the outer joint part forming a second stop-and-guiding face for a the spherical outer face of the ball cage; and wherein first outer tracks, together with first inner tacks, form first pairs of tracks whose control angles open in a first axial direction ($R_1$), and second outer tracks, together with second inner tracks, form second pairs of tracks whose control angles open in a second axial direction ($R_2$) different than the first axial direction ($R_1$), and wherein the control angles are defined as angles between tangents at ball contact points in the tracks when the joint is aligned; and wherein the inner face of the outer joint part is undercut-free if viewed in said second axial direction ($R_2$).

2. A joint according to claim 1, wherein the inner face of the ball cage, if viewed in said second axial direction ($R_2$), is undercut-free.

3. A joint according to claim 1, wherein the ball cage, on its inside, forms a third stop-and-guiding face for a spherical outer face of the inner joint part.

4. A joint according to claim 1, wherein the inner joint part is produced so as to be integral with a joint journal.

5. A joint according to claim 1, wherein the securing element is provided in the form of an annular element attached at a joint aperture of the outer joint part and that said second axial direction ($R_2$) points from the joint aperture to the central joint plane.

6. A joint according to claim 1, wherein the securing element comprises individual wedge elements attached or formed on at a joint aperture of the outer joint part and that said second axial direction ($R_2$) points from a joint aperture to a central joint plane.

7. At A joint according to claim 1, wherein the securing element is a joint base formed separately from the outer joint part and that said second axial direction points from the joint base to a central joint plane.

8. A joint according to claim 1, wherein the securing element is formed by a cover element inserted between the outer joint part and a joint base and that said second axial direction points from the joint base to a central joint plane.

* * * * *

UNITED STATES PATENT AND TRADEMARK OFFICE
CERTIFICATE OF CORRECTION

PATENT NO.         : 6,709,338 B2                                            Page 1 of 1
APPLICATION NO. : 10/020070
DATED              : March 23, 2004
INVENTOR(S)        : Thomas Weckerling et al.

It is certified that error appears in the above-identified patent and that said Letters Patent is hereby corrected as shown below:

Claim 7, Column 6, Line 58, should read as follows: -- 7. A joint according to claim 1, wherein the securing --

Signed and Sealed this

Thirteenth Day of March, 2007

JON W. DUDAS
*Director of the United States Patent and Trademark Office*